INVENTOR
JANIS A. SIRONS

Aug. 30, 1966  J. A. SIRONS  3,270,341
AIRCRAFT NAVIGATIONAL APPARATUS USING SCANNED
BEAM DOPPLER RADAR TO DETERMINE GROUND
SPEED, DRIFT ANGLE AND DISTANCE FLOWN
Filed Nov. 6, 1964  6 Sheets-Sheet 2

INVENTOR
JANIS A. SIRONS

BY
Harry A. Herbert Jr
ATTORNEY

James A. Shannon
AGENT

Aug. 30, 1966                J. A. SIRONS                3,270,341
        AIRCRAFT NAVIGATIONAL APPARATUS USING SCANNED
           BEAM DOPPLER RADAR TO DETERMINE GROUND
           SPEED, DRIFT ANGLE AND DISTANCE FLOWN
Filed Nov. 6, 1964                                    6 Sheets-Sheet 5
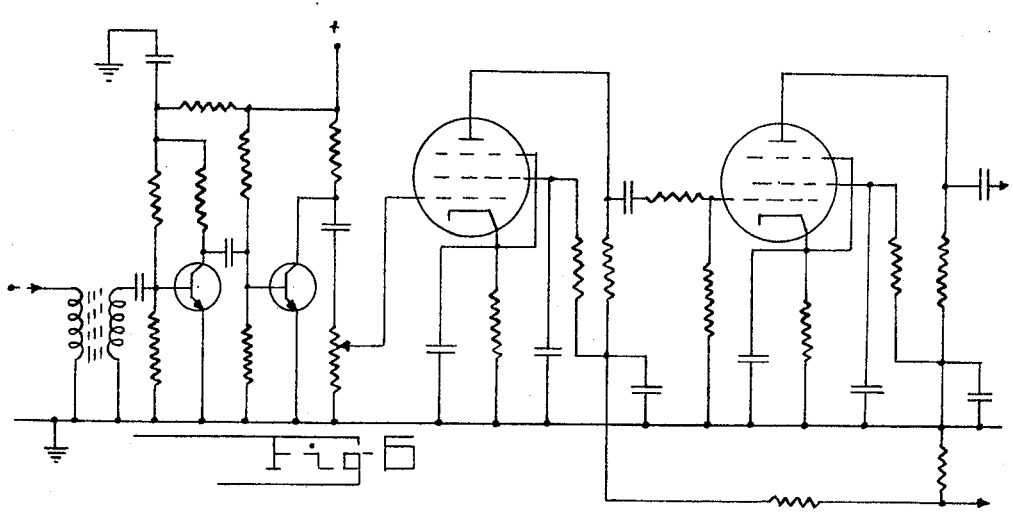
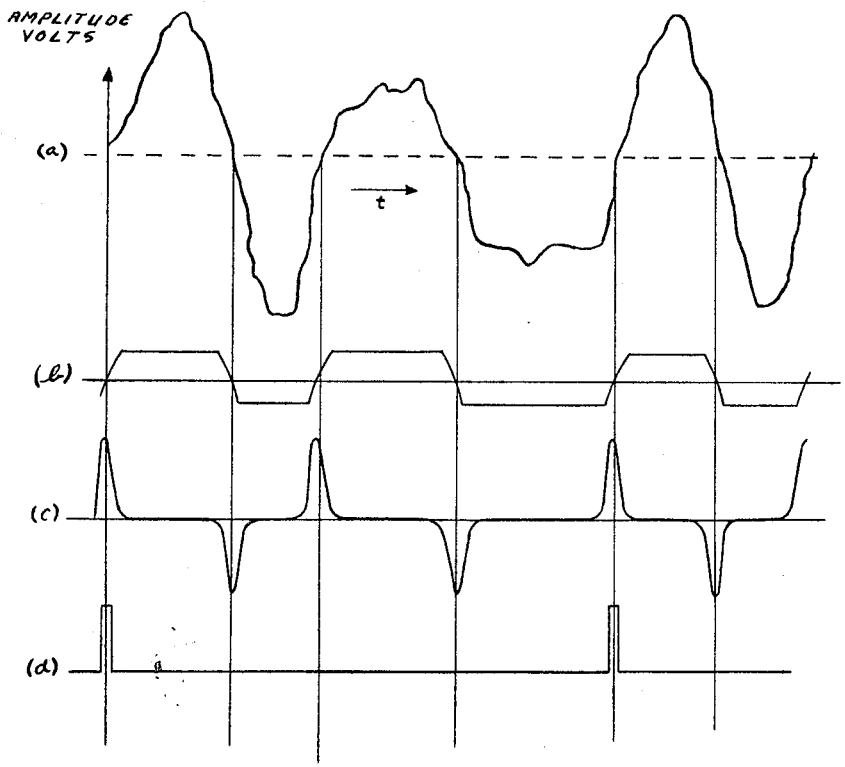
INVENTOR
JANIS A. SIRONS

Figure 1:
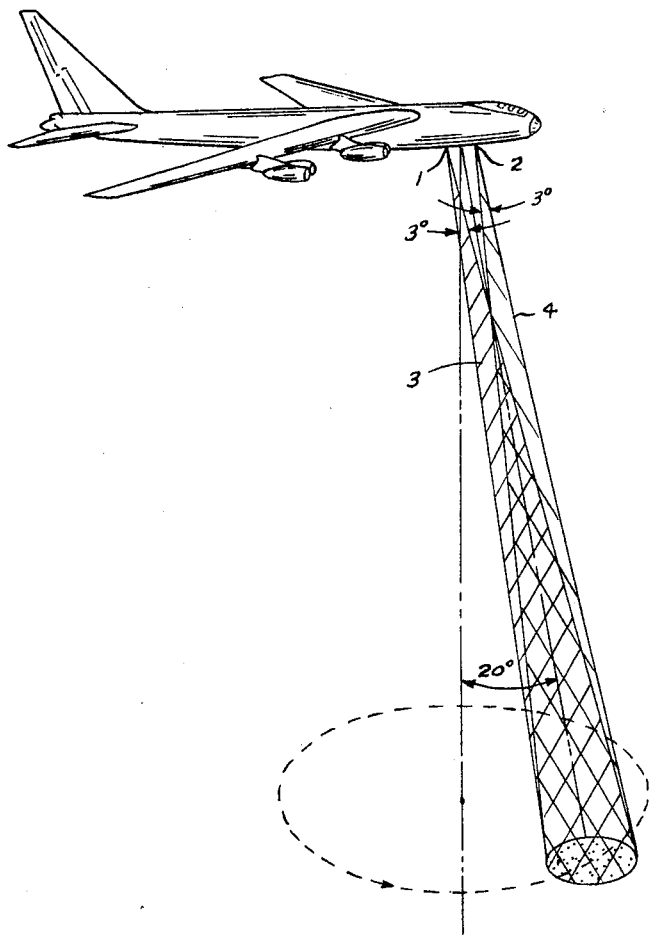

INVENTOR
JANIS A. SIRONS though, the antennas have a small physical separation on the aircraft, this separation is insignificant at normal flying altitudes and the patterns substantially coincide on the ground as indicated in FIG. 1. Consequently the receiving antenna receives reflected energy only from the area illuminated by the transmitting antenna.

United States Patent Office 3,270,341
Patented August 30, 1966

3,270,341
AIRCRAFT NAVIGATIONAL APPARATUS USING SCANNED BEAM DOPPLER RADAR TO DETERMINE GROUND SPEED, DRIFT ANGLE AND DISTANCE FLOWN
Janis A. Sirons, Springfield, Ohio, assignor to the United States of America as represented by the Secretary of the Air Force
Filed Nov. 6, 1964, Ser. No. 409,619
4 Claims. (Cl. 343—9)

The invention described herein may be manufactured and used by or for the United States Government for governmental purposes without the payment to me of any royalty thereon.

Doppler radar navigational systems have suffered from large size, weight and complexity, with the reliability limited by the complexity. It is the primary purpose of this invention to provide a Doppler navigational system that is greatly simplified in design with a proportionate increase in reliability and that has the desirable features for airborne use of small size and light weight. The weight may be reduced to about 50 pounds as compared with better than 200 pounds for present equipment.

Describing the invention briefly, the apparatus utilizes the scanned beam principle in which a single relatively narrow beam of continuously radiated high frequency energy inclined about 20° to the vertical is rotated at constant speed about a vertical axis so that the center of the antenna pattern moves in a circle beneath the aircraft. When the beam is pointed in the direction of the ground track of the aircraft the Doppler shift in the signal returned from the ground is at a maximum, whereas when the beam is at right angles to the ground track the Doppler shift is zero. Consequently, the Doppler shift is twice at the maximum and twice at zero in each scanning cycle of the beam, maximum and zero values alternating with 90° separation.

The receiving antenna on the aircraft has a beam width the same as that of transmitting antenna radiating the scanning beam and the axis of the receiving beam is maintained parallel to that of the radiated beam so that the patterns of the two antennas substantially coincide on the ground.

The signal output of the receiving antenna is immediately applied to a crystal diode detector along with a small amount of the radiated power to derive the Doppler frequency. The Doppler frequency is then converted into a train of identical short duration pulses on the basis of one pulse for each Doppler cycle. The ground speed, the distance traveled and the drift angle are derived from this pulse wave, or a submultiple of it, in the followings ways:

The average direct current component of the pulse wave is proportional to the average pulse repetition rate, which is proportional to the average Doppler frequency, which is proportional to ground speed. Therefore, a direct current meter measuring the average direct current component of the pulse wave may be calibrated to read ground speed directly.

The distance traveled is proportional to ground speed multiplied by time. A count of the total number of pulses is proportional to the average pulse repetition rate multiplied by time. Since, as seen above, average pulse repetition rate is proportional to ground speed, a total count of the number of pulses is proportional to the distance traveled in a given time. To indicate this distance, the pulse wave, divided in frequency to accommodate the capabilities of a mechanical counter, is used to derive such a counter calibrated to read distance directly.

The drift angle is the angle between the ground track of the aircraft and its longitudinal axis. As stated earlier, the Doppler frequency is greatest when the antenna beam is directed along the ground track and zero at 90° to the ground track. Therefore, a voltage proportional to the pulse wave repetition rate will have maxima when the scanning beam is in the direction of the ground track and will be zero when the beam is at right angles to the track. A phase comparison between this voltage and a voltage generated to have a fixed phase relation to the rotational cycle of the beam measured from the longitudinal axis of the aircraft gives the drift angle.

A more detailed description of the invention will be given with reference to the accompanying drawings in which—

Figure 2:
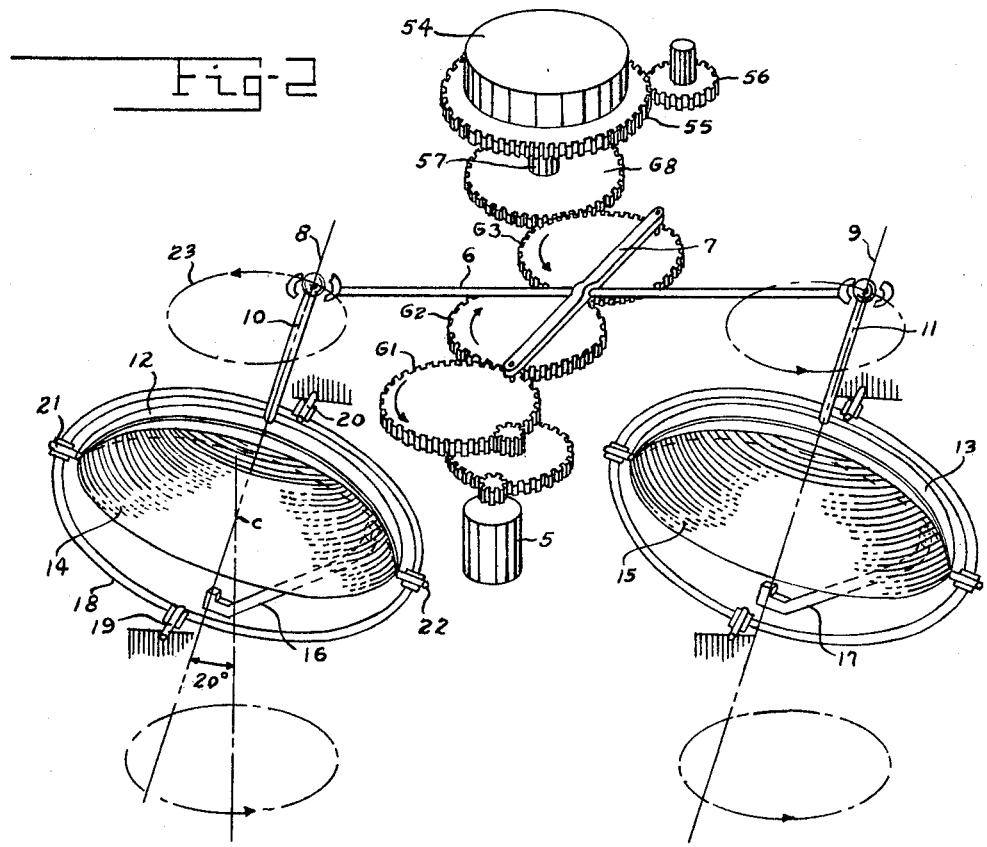
Figure 4:
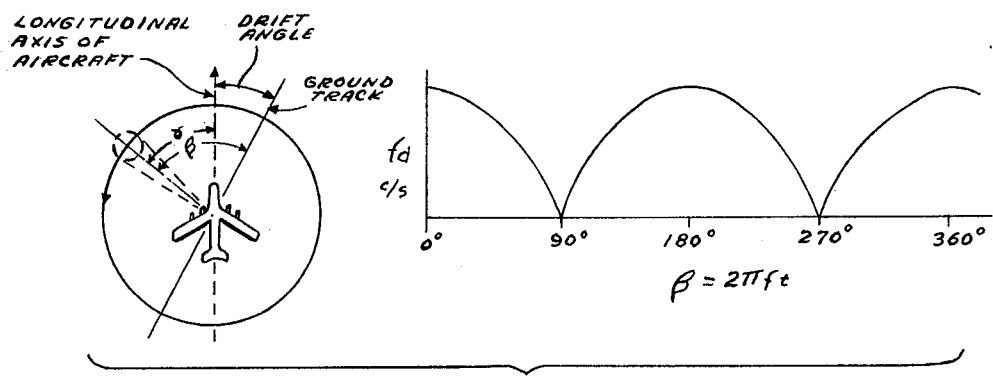
Figure 3:
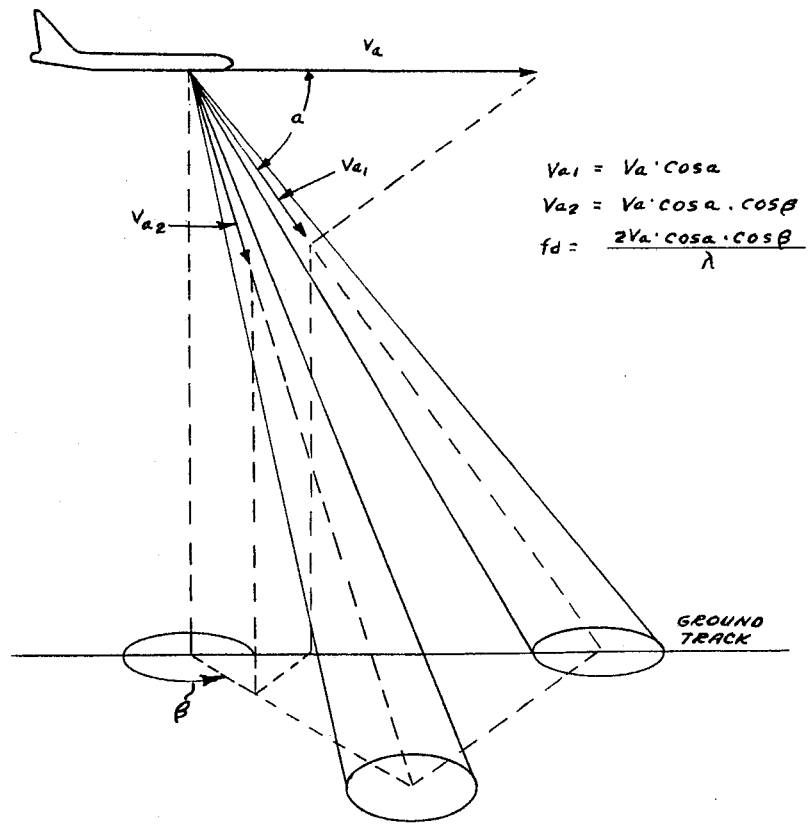
Figure 5:
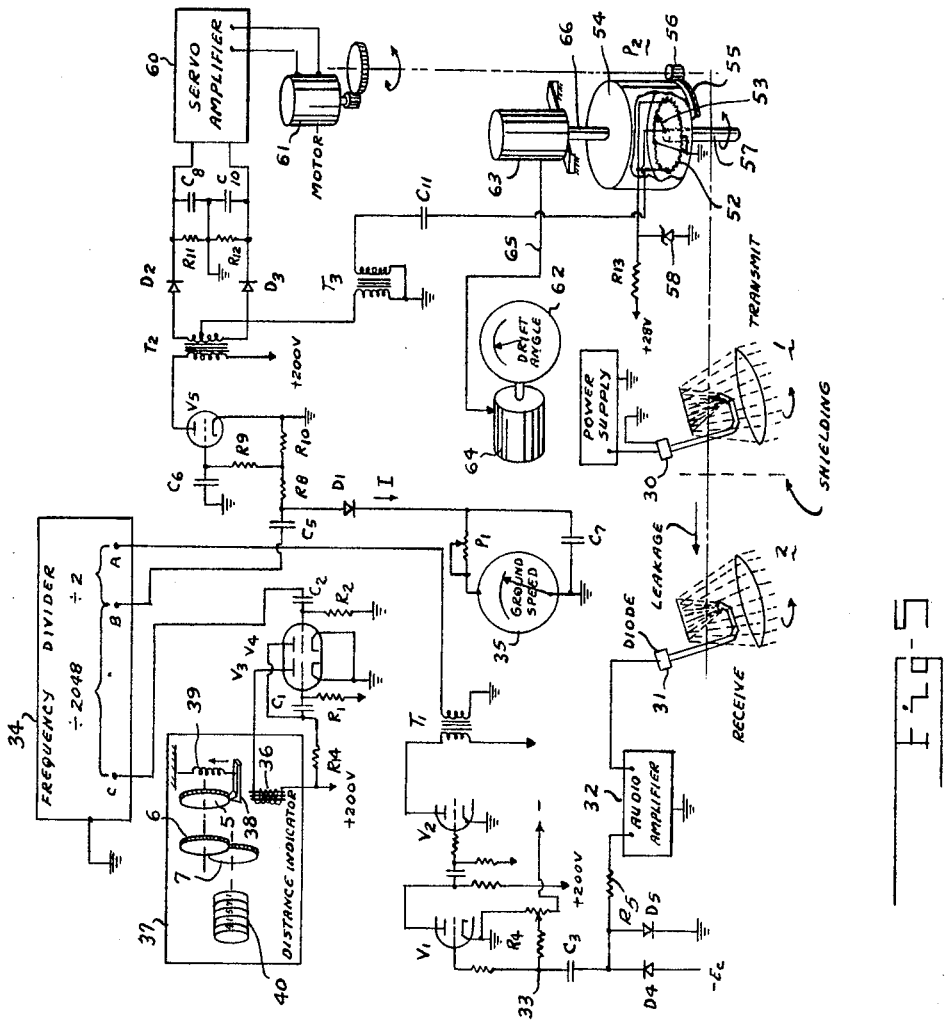
Figure 8:
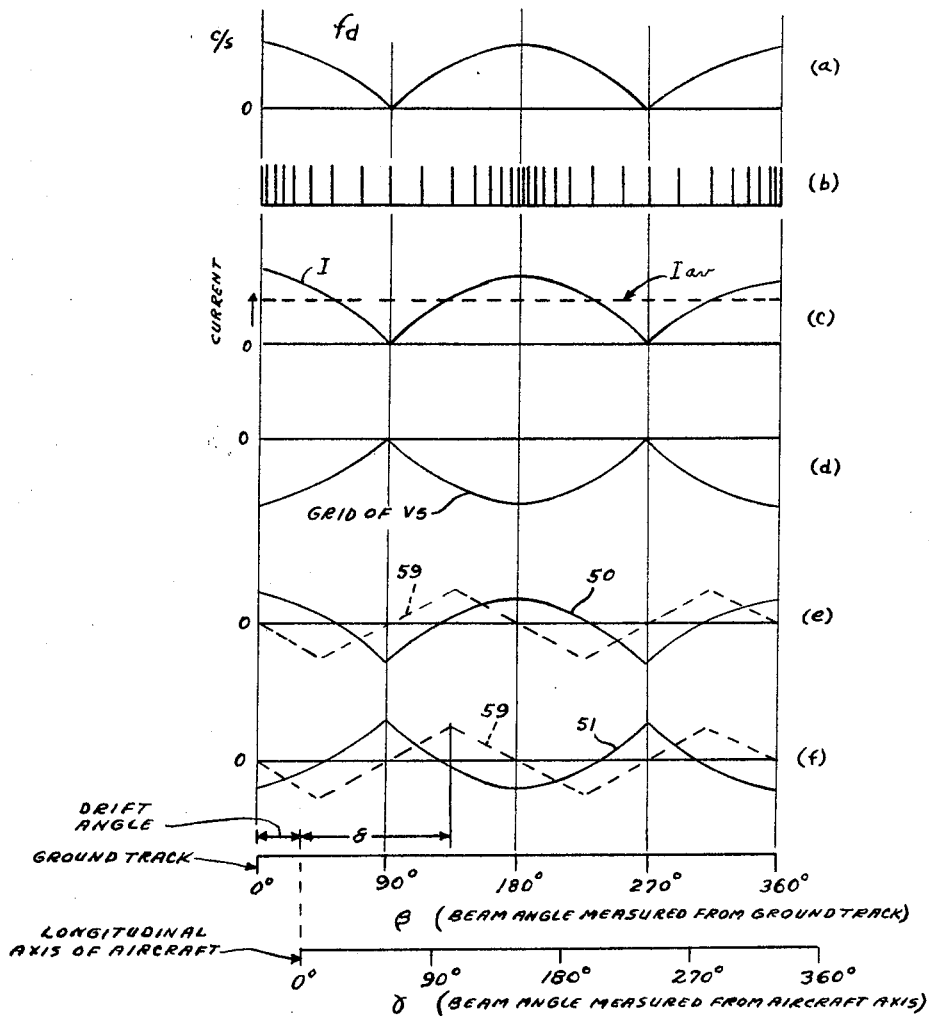

FIG. 1 illustrates the antenna scanning pattern,
FIG. 2 shows the construction of the antenna scanning mechanism,
FIG. 3 illustrates the geometry of the system and the Doppler relationships involved,
FIG. 4 shows the relationship between Doppler frequency and horizontal beam angle measured from the ground track,
FIG. 5 is a schematic diagram of the complete navigational system,
FIG. 6 is a circuit diagram of the amplifier receiving the detector output, and
FIGS. 7 and 8 show certain waveforms existing in the system of FIG. 5.

Referring to FIG. 1, the aircraft is equipped with similar transmitting and receiving antennas which may be located at points 1 and 2, respectively. The beams 3 and 4 of these antennas are conical with a small apex angle of, for example, 3° and their axes make an angle of, for example, 20° with the vertical. The antennas are so constructed and coupled mechanically, in a manner to be described later with reference to FIG. 2, that their beam axes always are parallel and rotate about the vertical at a constant speed of several revolutions per second. That the antenna axes are always parallel will be apparent from the geometry of FIG. 2, the apparent convergence of these axes in FIG. 1 being due to the fact that the aircraft and the antenna separation thereon are drawn to a much larger scale than the radiation pattern. The rotational speed selected is a compromise between the greater mechanical strength, weight and power requirements necessary for the higher scanning rates and the size of transformers required to handle alternating currents of scanning frequency at the lower rates. Al- The antenna scanning mechanism, shown in FIG. 2, consists of a gimbal assembly, gearing, linkage and a drive motor. The ratio between $G_1$ and the motor 5 is such that $G_1$ and $G_3$, driven from $G_1$ by idler $G_2$, revolve at a low speed, for example, 2 or 3 r.p.m. The gears $G_1$ and $G_3$ carry a rigid structure made up for arms 6 and 7 with the result that the outer ends of arm 6 describe circles in the horizontal plane. Ball and socket joints 8 and 9 at the ends of arm 6 couple this arm to antenna shafts 10 and 11. Bowed crossarms 12 and 13 rigidly attach the antennas, here shown as parabolic reflectors 14 and 15 with feed waveguides 16 and 17, to the antenna shafts 10 and 11. These antennas may also be of the reflector and lens type as illustrated in FIG. 5. Due to focal length folding, the lens type is more compact than the parabolic reflector type and is capable of somewhat narrower beam width. The transmitting and receiving antennas are similarly mounted. Referring to the transmitting antenna, there is provided a gimbal ring 18 pivoted by bearings 19 and 20 to rotate freely about a horizontal axis transverse to the longitudinal axis of the aircraft. The antenna is mounted in ring 18 at pivots 21 and 22 located 90° from bearings 19 and 20. The two degrees of freedom provided by the gimbal mounting allows the antenna shafts 10 and 11 to swing in a 360° circle. The center point of the antennas is marked C. The antenna axes form a 20° angle with the vertical. Therefore the radius of the circle 23 described by the motion of ball joints 8 divided by the distance 8–C equals sin 20°. The gimbal mounting provides a very small and light scanning mechanism. Since the antennas themselves to do not rotate there is no need for rotating joints in the RF feeds. Consequently, flexible transmission lines may be used for this purpose.

FIG. 3 illustrates the geometry of the system and the Doppler relationships involved. Vector $V_a$ represents the velocity of an aircraft in level flight. In the presence of a crosswind this vector is at a horizontal angle to the longitudinal axis of the aircraft. The ground track is the intersection with the earth of a vertical plane through the velocity vector. The angle $\alpha$ is the vertical angle between the velocity vector and the center line of the scanning beam. The angle $\beta$ is the horizontal angle of the scanning beam measured counterclockwise from the velocity vector or ground track. Vector $V_{a1}$ represents the aircraft velocity along the center line of the beam when the beam is directed along the ground track, i.e. when $\beta=0$. Vector $V_{a2}$ represents the velocity along the beam center line for the arbitrary value of $\beta$ indicated. The value of this vector is $$(1) \qquad V_{a2} = 2V_a \cos \alpha \cos \beta$$

Because of the Doppler effect the frequency received at the receiving antenna on the aircraft differs from the transmitted frequency by the amount $$(2) \qquad fd = \frac{2V_{a2}}{\lambda}$$

where $\lambda$ is the wavelength of the transmitted energy. Substituting the value of $V_{a2}$ from (1) gives $$(3) \qquad fd = \frac{2V_a \cos \alpha \cos \beta}{\lambda}$$

Equation 3 shows that for any given value of $V_a$ and for a fixed value of $\alpha$, $fd$ is proportional to $\cos \beta$. Therefore, $fd$ has maximum values at $\beta=0°$ and $\beta=180°$, is positive in the range 270°–90° indicating that the received frequency is higher than the transmitted frequency in this range, and is negative in the range 90°–270° indicating that the received frequency is less than the transmitted frequency in this range. The variation of $fd$ with $\beta$ is illustrated in FIG. 4. Since $\beta=2\pi ft$, the expression for $fd$ may also be written $$(4) \qquad fd = 4\frac{V_a \cos \alpha \pi ft}{\lambda}$$

where $f$ is the scanning frequency.

A schematic diagram of the navigational system is shown in FIG. 5. The transmitting antenna 1, here shown as a lens type with folded focal length, is supplied with continuous high frequency energy by klystron 30. The frequency may be 13.5 kmc./s. and the power 15 watts, for example. Energy reflected from the small area on the ground illuminated by the scanning beam is received by receiving antenna 2 which, as already explained, is always directed toward the illuminated spot, and applied directly to a crystal diode detector 31. The receiving antenna also receives a small amount of transmitter energy by leakage which should be limited to the required small amount by adequate shielding between the transmitting and receiving antennas. The two signals beat together in the detector diode circuit to produce a signal at the sum of the transmitted and received frequencies and a signal at the difference of these frequencies, the latter being the desired Doppler frequency $fd$. These signals, because of their great frequency difference, are easily separated in the detector circuit and the signal of difference frequency applied to the input of audio amplifier 32. This amplifier should have a low noise figure and relatively high gain. The schematic diagram of a suitable amplifier is shown in FIG. 6. Silicon low noise transistors are used in the first two stages to avoid tube microphonics.

The Doppler frequency output of amplifier 32 may have an irregular form, as seen at (a) in FIG. 7, due to irregularities of one kind or another in the reflectivity of the terrain. This wave is converted into a substantially rectangular wave by amplification and amplitude limiting involving Diodes $D_4$ and $D_5$ and tubes $V_1$ and $V_2$. The output of the amplifier is first applied to a limiting circuit comprising $R_5$, $D_4$ and $D_5$. Diode $D_5$ clips the wave substantially at ground level and $D_4$, which has a bias of $-E_c$, clips the wave at a voltage $E_c$ below ground. After having the direct current component removed by $C_3$, the resulting wave at point 33 is as represented by waveform (b) in FIG. 7. This wave is amplified and further limited in stages $V_1$ and $V_2$ to produce a substantially rectangular waveform in the output of $V_2$. Transformer $T_1$, acting as a differentiating network, converts the rectangular wave into a wave of alternate positive and negative pulses corresponding to the positive-going and negative-going edges of the square wave. This waveform is illustrated at (c) in FIG. 7 and it will be noted that one positive pulse occurs for each Doppler cycle.

The pulses from $T_1$ are applied to input terminal A of frequency divider 34. Divider 34 responds only to pulses of one polarity and therefore responds only to the positive pulses from $T_1$ or only to the negative pulses from $T_1$, depending upon the design. This element, in the specific embodiment shown, provides a division by 2 at terminal B and a total division of 4096 at terminal C. This is provided by a cascade of twelve binary counters, one located between terminals A and B and eleven located between terminals B and C. The binary counters may be of any type producing an output pulse of constant magnitude and duration, such as at (d) in FIG. 7 where the output at terminal B of the frequency divider is illustrated. Commercially available miniaturized counters are suitable for use in frequency divider 34. A particular counter that is available has a pulse width of 6 μs. and a pulse magnitude of 7 volts. Therefore, pulses of uniform magnitude and duration occur at terminals B and C with a repetition rate or $fd/2$ at terminal B and a repetition rate of $fd/4096$ at terminal C. The ground speed distance flown and drift angle are determined from these pulse trains.

The ground speed of the aircraft is proportional to the average Doppler frequency. The Doppler frequency $fd$ is proportional to $\cos \beta$ as shown in Equation (3), FIG. 4 and at (a) in FIG. 8. Therefore, the average Doppler frequency is equal to $2/\pi$ times the maximum Doppler frequency, or $$(5) \qquad fd_{av.} = fd_{max.} \cdot \frac{2}{\pi}$$

Since $fd_{max}$ occurs at $\beta=0$, $$(6) \qquad fd_{av.} = \frac{2V_a \cos \alpha}{\lambda} \cdot \frac{2}{\pi}$$

and the aircraft ground speed $V_g$ is $$(7) \qquad Vg = K \cdot \frac{2V_a \cos \alpha}{\lambda} \cdot \frac{2}{\pi}$$

As stated above, the repetition rate of the pulses at terminal B is proportional to the Doppler frequency $fd$, being equal to $fd/2$, and varies with B as shown in a general way at (b) in FIG. 8. Since these pulses are of constant magnitude and duration, the direct current represented by them is proportional to their repetition rate and therefore to $fd$. Consequently, the direct current output I of diode $D_1$, to which the pulses at terminal B are applied through $C_5$, varies as shown at (c) in FIG. 8. Since I is proportional to $fd$, the average value $I_{av}$ of I is proportional to the average value of $fd$ and therefore to the ground speed. Direct current meter 35 reads $I_{av}$ and therefore may be calibrated directly in ground speed units, such as knots per hour.

$C_7$ is a large capacitor used to prevent meter pointer fluctuation and $D_1$ is a variable resistor used for fine adjustment of the meter calibration. The principal purpose of the frequency divider 34 is for distance measurement, as will be seen later. The first counter stage is used in ground speed measurement only as a convenient means for obtaining pulses of constant magnitude and duration from the pulse output of $T_1$. Any other suitable wave shaping network or pulse generator providing pulses of the desired constant magnitude and duration could be used. If the network chosen does not provide a division by 2, then an additional divider stage may be inserted between terminals B and C.

The distance flown by an aircraft during a given time interval is equal to the average ground speed multiplied by the time interval. The ground speed, as shown above, is proportional to the average Doppler frequency. Since the total number of Doppler cycles occurring during a time interval is proportional to the average Doppler frequency, a count of the total number of Doppler cycles during the interval is proportional to the distance traveled. Consequently, the total number of pulses occurring at terminal A, B or C of frequency divider 34 would be proportional to the distance traveled since the number of pulses occurring at each of these terminals is proportional to the total number of Doppler cycles. However, in order to reduce the repetition rate of the pulses to the capability of a mechanical counter, the pulses at terminal C which have a maximum repetition rate of $fd_{max}/4096$ are utilized.

The pulses at terminal C have, as stated earlier, a 6 μs. duration which is too short to actuate an electro-mechanical counter. Therefore, the pulses are first widened and amplified in a circuit comprising tubes $V_3$ and $V_4$. Each of the positive-going 6 μs pulses rapidly charges $C_2$ through the low grid-cathode impedance of $V_4$. $C_2$ then slowly discharges through $R_2$ to produce an elongated negative pulse on the grid of this tube. The corresponding elongated positive pulse on the anode of $V_4$ is amplified by $V_3$ which produces a corresponding elongated pulse of current through solenoid 36 of the distance indicator 37. Energization of solenoid 36 pulls down armature 38 against the force of spring 39 then which acts through the armature when the solenoid is deenergized to rotate counter gear $G_5$ one step. The gear ratio between the solenoid actuator and counter 40 is made such that the counter reads directly in nautical miles. The following numerical example shows how the gear ratios are determined:

Assume the maximum ground speed is 500 knots per hour and the transmitter frequency is 13.5 kmc./s. The wavelength is $$\lambda = \frac{3 \times 10^{10}}{13.5 \times 10^9} = 2.22 \text{ centimeters}$$

One nautical mile is 185,300 centimeters. Since the maximum Doppler frequency occurs when $\beta = 0$, substituting in Equation 3, letting $\alpha = 70°$, gives $$fd_{max} = \frac{2 \times 500 \times 185,300 \times 0.342}{3600 \times 2.22} = 7930 \text{ c./s.}$$

Since the average Doppler frequency is $2/\pi$ times the maximum Doppler frequency, $$fd_{av.} = fd_{max.}\frac{2}{\pi} = 7930 \times \frac{2}{\pi} = 5050 \text{ c./s.}$$

Since frequency divider 34 has a division factor of 4096 at terminal C, the maximum pulse rate at which solenoid 36 must operate is $$\frac{5050}{4096} = 1.23 \text{ pulses per second}$$

which is within the capability of a device of this type.

Since a speed of 500 knots/hour produces 1.23 pulses per second, then there are $(1.23 \times 3600)/500$ or 8.85 pulses produced for each nautical mile traveled, which figure holds for all ground speeds since the ground speed cancels out in the computation. Counter 40 is a decimal counter with ten digits on each wheel. Therefore, if the first wheel reads units, and if gear $G_5$ is given ten teeth so that ten pulses are required at solenoid 36 to rotate it through one revolution, then the ratio of gears $G_6$ and $G_7$ is given by the expression $$\frac{1}{10} = \frac{G_6}{G_7} \cdot \frac{8.85}{10}$$

from which $$\frac{G_7}{G_6} = \frac{8.85}{1} = \frac{177}{20}$$

Therefore, the correct ratio is provided by 20 teeth in $G_6$ and 177 teeth in $G_7$.

The drift angle of the aircraft, as indicated in FIG. 4, is the angle between the velocity vector or ground track and the longitudinal axis of the aircraft. The drift angle circuit compares the phase of a wave that varies in amplitude as the Doppler frequency with the phase of a wave having a fixed relation to the rotational phase of the antenna measured from the aircraft axis to determine the drift angle which is displayed on an indicator. A description of the drift angle circuit follows:

In the ground speed indicator circuit previously described, the positive portions of the A.C. pulse wave applied to diode $D_1$ flows through meter 35 to ground. The negative portions of this wave cause a pulse current to flow upward through $R_{10}$ and $R_8$ the average value of which at any instant, as in the case of the current through $D_1$, is proportional to the Doppler frequency at that instant. A voltage proportional to the instantaneous average value of this current is obtained by time constant circuit $R_9$–$C_6$ and applied to the grid of $V_5$. This negative-going voltage, shown at (d) in FIG. 8, is a cosine function of $\beta$ like the Doppler frequency variation shown at (a) and its presence on the grid of $V_5$ causes similar voltage waves in each half of the secondary winding of center tapped transformer $T_2$. These voltage waves, illustrated by waveforms 50 and 51 at (e) and (f) of FIG. 8, are equal in amplitude and opposite in phase, one having the same phase as the wave on the grid of $V_5$ and the other having the opposite phase, as illustrated.

The potentiometer generally designated $P_2$ has a circular linear resistance element 52 and a rotatable contact 53. The resistance element is permanently attached to housing 54 which may be rotated about the axis of rotation of contact 53 by gear 55 and pinion 56. Shaft 57, which carries contact 53, is coupled to gear $G_3$ of the antenna rotating mechanism by gear $G_8$ as seen in FIG. 2. The $G_8$ to $G_3$ ratio is 1:1 so that contact 53 rotates at the same speed as the scanning beam. The resistance element is provided with four taps spaced 90° apart with oppositely disposed taps connected together, and is energized by applying a constant direct voltage between the connected pairs of taps. The energizing voltage is held constant by a regulator comprising $R_{13}$ and zener diode 58. The voltage wave generated by rotation of the contact 53 is applied to the primary of $T_3$. The secondary voltage of this transformer, which is applied between the center tap of the $T_2$ secondary and ground, is illustrated by waveform 59 at (e) and (f) in FIG. 8.

With the above described arrangement, each of the diodes $D_2$ and $D_3$ receives two voltages: one is the voltage represented by triangular waveform 59 and the other is one of the voltages represented by waveforms 50 and 51. The relative phase relations between waveform 59 and waveforms 50 and 51 determine the relative rectified outputs of the diodes.

Since the coupling between contact 53 and the beam rotating mechanism is normally permanent and fixed, the phase difference between the triangular waveform 59 and the scanning cycle, represented by δ in FIG. 8, depends upon the angular position of potentiometer case 54 and may be varied by rotating this case. For any given drift angle, there will be some value of δ for which the outputs of $D_2$ and $D_3$ are equal so that the voltages across $R_{11}$–$C_8$ and $R_{12}$–$C_{10}$ are equal and the error signal input to servo amplifier 60 is zero. This value of δ will be such that the positive peak of waveform 59 lies somewhere near the midpoint between the positive peaks of waveforms 50 and 51, as illustrated in FIG. 8. If δ does not have the correct value then the outputs of $D_2$ and $D_3$ are unequal and an error signal is produced that indicates by its polarity the direction of the error. The resulting output from servo amplifier 60 drives servo motor 61 which in turn rotates case 54 in the proper direction through pinion 56 and gear 55 until balance is restored and the error signal returns to zero. Therefore, the value of δ, or the angular position of case 54, is always indicative of the drift angle.

The above is illustrated graphically in FIG. 8 considering the longitudinal axis of the aircraft as a fixed reference, if the drift angle increases the waveforms 50 and 51 move to the left in the diagram. This requires an equal decrease in δ in order to preserve the balanced phase relation between waveform 59 and waveforms 50 and 51. Similarly, if the drift angle decreases, the waveforms 50 and 51 move to the right in the diagram requiring an equal increase in δ to preserve the prior balanced phase relationship.

In order to transmit the angular position of case 54 to a remotely located drift indicators 62, a synchro transmitter 63, synchro receiver 64 and interconnecting circuit 65 may be employed. The rotor of synchro 63 is attached to case 54 by shaft 66. To align indicator 62, either the case of synchro 63 or the case of synchro 64 may be temporarily loosened and rotated to bring the pointer of the indicator into alignment with the known drift angle.

I claim:

1. Navigational apparatus for aircraft comprising: a transmitting antenna and a receiving antenna, said antennas having similar directional patterns centered on directional axes; means maintaining the directional axes of said antennas always parallel and pointing downward at the same fixed acute angle with the vertical; means for rotating said directional axes at constant speed about the vertical; means for applying continuous high frequency energy to said transmitting antenna; a crystal detector network coupled directly to said receiving antenna for converting the transmitted energy received by reflection from the ground and by leakage from the transmitting antenna into an output signal having a frequency equal to the difference between the leakage and reflected energies; means for converting the output signal of said detector into a substantially rectangular wave of the same frequency; a differentiating network receiving said rectangular wave and producing therefrom a series of sharp pulses alternating in polarity and coincident with the leading and trailing edges of said rectangular wave, whereby in each set of pulses of the same polarity there is one pulse for each cycle of the detector output signal; a pulse generating network responsive to pulses of a single polarity at its input to provide pulses of constant magnitude and duration at its output having a repetition rate proportional to the repetition rate of the unipolar pulses at its input; means for applying the pulses produced by said differentiating network to the input of said pulse generating network; an indicating electro-mechanical pulse counter; a frequency divider connected between said electro-mechanical pulse counter and the output of said pulse generator for applying to said counter pulses having a repetition rate proportional to the rate at the output of said pulse generator and within the counting rate capability of said counter, said counter indicator being calibrated to read distance flown; a pair of terminals having two parallel paths therebetween, one path containing a unidirectional device and a direct current meter in series and the other path being resistive; means for applying the alternating current component of the pulse output of said pulse generator across said pair of terminals, said meter indicating the average current passed by said unidirectional device and being calibrated to read ground speed; a phase comparison circuit; means including a time constant circuit coupled between said resistive path and said phase comparison circuit for applying thereto a first voltage wave varying in amplitude directly with the pulse repetition frequency of the output of said pulse generator; wave generating means coupled to the said directional axes rotating means for generating a second voltage wave having a period equal to one half the rotational period of said directional axes and variable in phase relative to the rotational cycle of said directional axes; means for applying said second voltage wave to said phase comparison circuit, said circuit operating to produce a direct error voltage that is zero when said first and second voltage waves have a predetermined fixed phase relation and is greater than zero when the phase relation departs in either direction from said predetermined relation, the polarity of the error voltage indicating the direction of the departure; servo means responsive to said error signal and coupled to said second voltage wave generating means for changing the phase of said second voltage wave relative to the rotational cycle of said directional axes in the direction indicated by the error signal polarity; and means calibrated to read drift angle for indicating the phase of said second voltage wave relative to the rotational cycle of the said directional axes.

2. Navigational apparatus for aircraft comprising: a transmitting antenna and a receiving antenna, said antennas having similar directional patterns centered on directional axes; means maintaining the directional axes of said antennas always parallel and pointing downward at the same fixed acute angle with the vertical; means for rotating said directional axes at constant speed about the vertical; means for applying continuous high frequency energy to said transmitting antenna; a crystal detector network coupled directly to said receiving antenna for converting the transmitted energy received by reflection from the ground and by leakage from the transmitting antenna into an output signal having a frequency equal to the difference between the leakage and reflected energies; means for converting the output signal of said detector into a substantially rectangular wave of the same frequency; a differentiating network receiving said rectangular wave and producing therefrom a series of sharp pulses alternating in polarity and coincident with the leading and trailing edges of said rectangular wave, whereby in each set of pulses of the same polarity there is one pulse for each cycle of the detector output signal; a pulse generating network responsive to pulses of a single polarity at its input to provide pulses of constant magnitude and duration at its output having a repetition rate proportional to the repetition rate of the unipolar pulses at its input; means for applying the pulses produced by said differentiating network to the input of said pulse generating network; an indicating electro-mechanical pulse counter; a frequency divider connected between said electro-mechanical pulse counter and the output of said pulse generator for applying to said counter pulses having a repetition rate proportional to the rate at the output of said pulse generator and within the counting rate capability of said counter, said counter indicator being calibrated to read distance flown; a pair of terminals having two parallel paths therebetween, one path containing a unidirectional device and a direct current meter in series and the other path being resistive; means for applying the alternating current component of the pulse output of said pulse generator across said pair of terminals, said meter indicating the average current passed by said unidirectional device and being calibrated to read ground speed; a transformer having a primary and a center tapped secondary; means including a time constant circuit and an amplifier coupled between said resistive path and the primary of said transformer for applying to said primary a voltage proportional to the pulse repetition frequency of the output of said pulse generator; a pair of rectifying diodes having their anodes connected to the terminals of the secondary winding of said transformer and having a load resistance connected between their cathodes; a rotary potentiometer comprising a circular linear resistance element and a sliding contact both rotatable about a common axis; a fixed coupling between said potentiometer contact and the rotating means for the directional axes of said antennas for rotating said contact about said common axis at the rotational speed of said directional axes; taps spaced 90 degrees apart on said circular resistance element; a source of direct current having one terminal connected to two of said taps 180° apart and the other terminal connected to the other two taps; means for applying the alternating current component of the voltage generated between said potentiometer contact and one terminal of said direct current source between the center tap of the secondary winding of said transformer and the center of said load resistance; a servo motor coupled to rotate said potentiometer resistance element about said common axis; a servo amplifier having its output coupled to said motor and its input coupled across said load resistance, said amplifier operating to energize said motor in the presence of an error voltage across said load resistance to rotate the resistance element of said potentiometer in a direction determined by the polarity of said error voltage; and means calibrated to read drift angle for indicating the angular position of said potentiometer resistance element.

3. An antenna structure for a Doppler radar navigational system for aircraft comprising: a pair of gimbal rings pivoted at adjacent corners at opposite ends of a rectangle; a transmitting antenna and a receiving antenna having similar directional patterns centered on directional axes, said transmitting antenna being pivoted in one of said gimbal rings at points 90° from the ring pivot points and in a common plane therewith, and said receiving antenna being similarly mounted in the other gimbal ring; an arm rigidly attached to said transmitting antenna and extending from its back side in coaxial relation to the directional axis of the antenna, and a similar arm of the same length similarly attached to the receiving antenna; a rigid structure attached to the ends of said arms by ball and socket joints lying on an axis parallel to the sides of said rectangle and spaced by a distance equal to the distance between said gimbal ring pivot axes; and rotary driving means coupled to said rigid structure at two points spaced apart in a direction parallel to the plane of said rectangle for rotating said points, and therefore all points on said rigid structure, at constant speed in the same direction around the circumferences of equal circles parallel to the plane of said rectangle, while maintaining the parallel relationship of the axis on which said ball joints lie to the sides of said rectangle, the position of said rigid structure relative to said antennas being such that the circles described by the centers of said ball joints are centered on axes normal to the plane of said rectangle and passing through the points of intersection of said gimbal ring pivot axes and said antenna pivot axes.

4. Apparatus as claimed in claim 3 in which the last means comprises a train of three gears lying in a plane parallel to the plane of said rectangle, the first and last gears in said train having the same number of teeth; means pivotally coupling said rigid structure to points on said first and last gears at equal angular positions and radii; and means for driving one of said gears at constant speed.

References Cited by the Examiner

UNITED STATES PATENTS

| | | | |
|---|---|---|---|
| 2,223,224 | 11/1940 | Newhouse | 343—9 X |
| 2,853,700 | 9/1958 | Cherry | 343—9 |
| 3,144,646 | 8/1964 | Breithaupt | 343—9 |
| 3,167,762 | 1/1965 | Vosburgh et al. | 343—9 |

CHESTER L. JUSTUS, *Primary Examiner.*

R. D. BENNETT, *Assistant Examiner.*